INVENTOR
Louis W. Schreiner
BY Hofgren, Wegner, Allen, Stellman & McCord
ATTORNEYS

United States Patent Office 3,452,152

Patented June 24, 1969

3,452,152

DUO-DIODE KEYED AGC CIRCUIT

Louis W. Schreiner, Palatine, Ill., assignor to Warwick Electronics Inc., a corporation of Delaware Filed Feb. 1, 1966, Ser. No. 524,089
Int. Cl. H04n 3/16, 5/38
U.S. Cl. 178—7.3 18 Claims

ABSTRACT OF THE DISCLOSURE

A first diode and a source of horizontal synchronizing component are connected in a first circuit with the video amplifier of a television receiver. A second diode is AC coupled to a point in the first circuit which is rendered representative of the video amplifier output by the horizontal component driving the first diode into its opposite conduction state. The signal detected by the second diode is integrated to develop an AGC signal.

This invention relates to an automatic gain control (AGC) circuit, and more particularly to an AGC circuit for use in a television signal receiver and keyed with the horizontal sweep component of the television signal.

In order to minimize the effects of varying amplitude signals received by a television receiver, automatic gain control circuits are commonly employed. The received composite television signal is composed of video information which varies with the scene being transmitted, and synchronizing pulses whose transmitted amplitude remains constant at all times. An effective AGC circuit is the keyed type, which develops a signal representative of the magnitude of only the horizontal synchronizing pulse component of the composite signal.

Prior keyed AGC circuits have not been entirely satisfactory either in operation or in the number and complex type of electrical components used to form their circuitry. A satisfactorily operating AGC circuit should completely separate the horizontal synchronizing pulse from the remaining video components of the received composite signal. Additionally, the AGC voltage should respond readily to rapid signal amplitude variations such as airplane flutter, caused by unsteady signal reflections bouncing off passing aircraft. The amplitude range of the AGC voltage should be adequate to compensate for large signal variations. When a minimum amplitude signal is being received, the developed AGC voltage should be of a polarity and amplitude which allows the IF stage to develop maximum amplification. When a television signal receiver uses transistors in place of vacuum tubes, an AGC current signal must be developed in place of the more conventional AGC voltage signal.

One object of this invention is to provide a keyed AGC circuit of improved design.

Another object of this invention is to provide a keyed AGC circuit using only diodes as the electron valves.

One feature of this invention is the provision of an improved keyed AGC circuit which provides maximum separation between the horizontal synchronizing components and the video information components of a received composite television signal.

Another feature of this invention is the provision of a keyed AGC circuit which develops, in the presence of a received television signal of minimum amplitude, an output AGC voltage of a magnitude for most advantageously operating the IF stage of the receiver.

Still another feature of this invention is the provision of a keyed AGC circuit which develops an output current for controlling a transistorized television receiver. The current output may be of either positive or negative polarity, or both polarities may be derived simultaneously for controlling different portions of the receiver circuitry.

Other advantages and features of the invention will be apparent from the following specification and from the drawings, in which.

Figure 1:
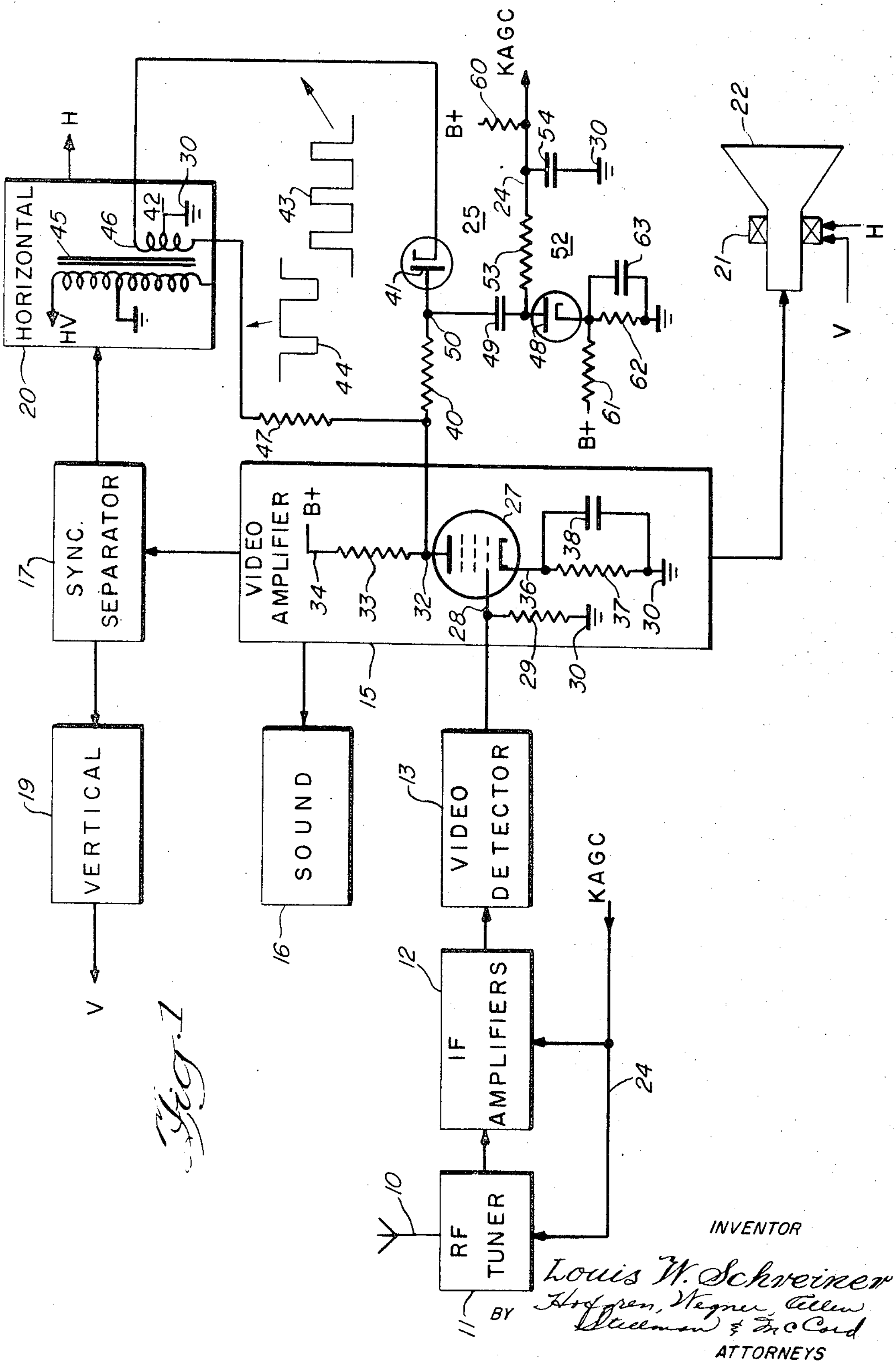
FIGURE 1 is a diagram, partly block and partly schematic, of a television signal receiver using an embodiment of the invention.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. Throughout the specification, values will be given for the components in order to disclose a complete, operative embodiment of the invention. However, it should be understood that such values are merely representative and are not critical unless specifically so stated. The scope of the invention will be pointed out in the appended claims.

Turning now to FIGURE 1, a television signal receiver is illustrated partly in block and partly in schematic form. An antenna 10 receives composite television signals which include synchronizing signal components and audio and video information components. An RF tuner 11, which typically includes an RF amplifier and a mixer-oscillator circuit, converts the composite signal at antenna 10 to an intermediate frequency signal. This IF signal is amplified by an IF stage 12 and detected in a video detector 13. The output of the detector is coupled to a video amplifier stage 15.

Various take-off circuits in video stage 15 separate the sound and synchronizing components of the composite signal from the video information. A sound stage 16 demodulates the FM sound component and produces an audible output signal. A synchronizing signal separator 17 separates the synchronizing pulses from the remaining composite signal. These separated pulses cause vertical 19 and horizontal 20 scanning stages to oscillate in phase with the vertical and horizontal scanning signals in the composite signal. The output signals from the vertical and horizontal scanning circuits are coupled to a deflection yoke 21 on the neck of a cathode ray tube 22. Yoke 21 causes an electron beam to scan the face of the picture tube, producing a visible raster in a manner well known in the art.

The video component of the composite signal is amplified by video stage 15 and coupled to CRT 22 for control of the intensity of the electron beam deflected by yoke 21.

The gain of RF tuner 11 and IF amplifier 12 is controlled by an AGC voltage present on a line 24. For a typical vacuum tube television signal receiver, the voltage on line 24 should range from a value near ground potential when no signal is received to a negative potential of the order of 20 volts when a strong signal is received.

Since the basic television receiver illustrated in block form and described above is known, further explanation of the overall operation of this receiver will not be necessary.

In accordance with the present invention, a novel keyed AGC circuit 25 is provided for developing a suitable control voltage on line 24. This control potential is developed from the signal available at one of the output electrodes of a video amplifier 27 in video stage 15. Amplifier 27 is a multi-element electron tube having a control grid 28 directly coupled to video detector 13. The driving voltage for amplifier 27 is developed across a grid resistor 29, connected between control grid 28 and a source 30 of ground or reference potential. A plate output electrode 32 is connected through a load resistor 33 and a line 34 to a source of positive potential, or B+. The B+ source may be obtained from the conventional low voltage section of television signal receivers, and should be on the order of 270 volts. A cathode output electrode 36 is coupled through a paralleled cathode resistor 37 and cathode capacitor 38 to ground 30, in a manner conventional for video amplifiers.

Video amplifier 27 develops across load resistor 33 a positive going composite television signal, i.e., the tip of the horizontal synchronizing pulse is positive with reference to ground 30.

Keyed AGC circuit 25 includes a series connected 100 kilohm resistor 40, a first diode 41, and a source 42 of positive pulses 43 and negative pulses 44 in synchronism with the horizontal synchronizing component of the received composite signal. Diode 41 is directly DC coupled through resistor 40 with plate 32 of the video amplifier.

A pulse is generated in a flyback transformer 45 in horizontal stage 20 during the retrace period which is in synchronism with the horizontal component of the received signal. This pulse is stepped up by transformer action to provide the high voltage (HV) supply for the television receiver. Source 42 is formed from an additional tapped winding 46 on flyback transformer 45, one side of the winding being coupled between ground 30 and diode 41 and the other side being connected to plate 32 through a resistor 47. The collapsing field around the windings on transformer 45 induces in winding 46 a positive pulse 43 and a negative pulse 44 during the retrace period which is in synchronism with the received horizontal synchronizing component.

A second diode 48 is AC coupled by a 560 micromicrofarad capacitor 49 to a junction point 50 between resistor 40 and diode 41. An integrating network 52, formed from a 100 kilohm resistor 53 and a 0.03 microfarad capacitor 54, is coupled across diode 48.

In operation, diode 41 is poled to conduct the positive potential at plate 32. As a result, junction point 50 is clamped at substantially the potential of ground 30. However, during the retrace period, pulse 43, on the order of 250 volts, drives the cathode of diode 41 more positive than the plate. This cuts off diode 41, causing junction point 50 to rise to the potential existing at that moment at plate 32, i.e., the potential of the horizontal synchronizing component.

The sudden rise in potential at point 50 causes current to flow through capacitor 49 and through rectifying diode 48 to ground 30. Due to capacitor 49, DC current is blocked, and only pulses are applied to detector 48. This results in complete separation of the horizontal synchronizing component from the video signal.

The rise in potential at point 50 also causes a pulse to be passed through resistor 40 to the plate of the video amplifier, atenuated approximately in the ratio of resistor 40 and 33. These pulses, though small, can cause undesirable effects on other portions of the receiver. Resistor 47 from the negative portion of winding 46 to the plate 32 of the video amplifier is chosen of such a valve as to cancel the undesired pulse.

The signal at diode 48 is integrated by network 52, producing an AGC potential on line 24 which can vary for a transient period of time from minus 60 volts with no signal received to minus 160 volts when a strong signal is received. The increasing negative potential decreases the gain of the amplifiers in RF tuner 11 and IF amplifiers 12, thereby maintaining the detected signal level at a constant value.

This magnitude of negative voltage is too large for conventional small signal amplifiers and can be biased in the positive direction by the addition of 20 megohm resistor 60 between the keyed AGC bus 24 and B+. Resistor 60 is chosen so the transient voltage on the keyed AGC bus swings from zero to minus 100 volts. Another means of eliminating this unusable portion of the DC AGC voltage is accomplished by resistors 61 and 62 which form a bias network for biasing the cathode of diode 48 positive, thus causing it to see only the most positive portion of the keying pulse, which is the most active with signal variation. A capacitor 63 forms a bypass to the pulse frequency.

While either the addition of resistor 60, or voltage divider network 61, 62 can be used alone to change the range of AGC voltage, the most efficient system was derived by using a combination of both.

Pulses 43 are preferably narrower than the width of the horizontal synchronizing component. Similarly, integrating network 52 preferably has a short time constant which responds quickly to signal amplitude variations. As a combined result of the narrower gating pulses 43 and the short time constant network 52, the keyed AGC circuit substantially eliminates airplane flutter and similar disturbances otherwise visibly noticeable in the picture.

Figure 2:
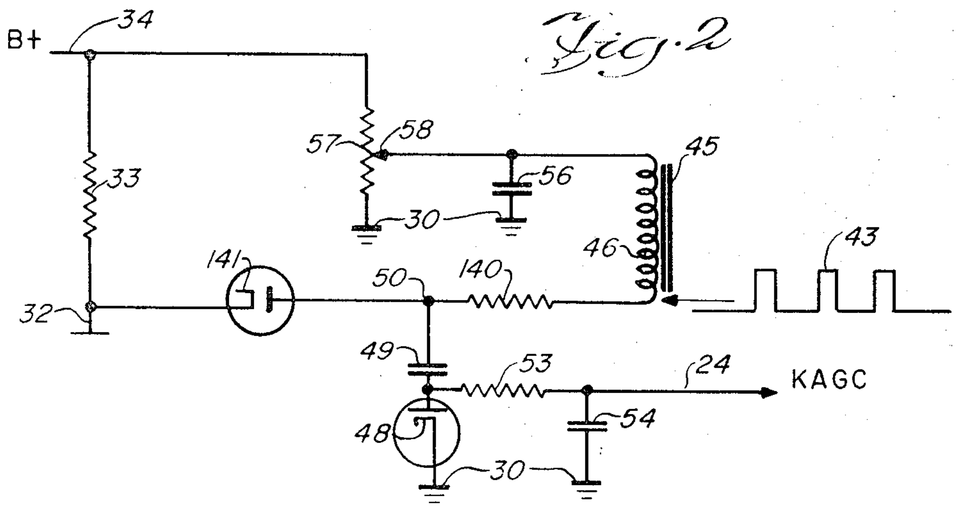
FIGURE 2 is a schematic diagram of another embodiment of the invention.

In FIGURE 2, a modified form of the invention is illustrated which develops a range of AGC potentials which are closer to the potential of ground 30 when low amplitude input signals are received. Components which perform similar but not identical functions to those performed in FIGURE 1 are indicated by reference numbers 100 higher than FIGURE 1.

A diode 141 and a 100 kilohm resistor 140 are connected in series between winding 46 and plate 32 of the video amplifier. In place of directly grounding the opposite end of winding 46, an impedance path to ground is formed through a 0.005 microfarad capacitor 56 and a portion of a 500 kilohm variable resistor 57 below a tap 58 thereon. Resistor 57 is connected between ground 30 and B+. Capacitor 56 acts as a short to ground at the frequency of pulses 43 from transformer 46.

In this circuit, diode 141 is poled to prevent conduction during the trace interval. Thus, junction point 50 is held at a DC potential determined by the setting of tap 58 on variable resistor 57. During the retrace interval, a positive going pulse 43 is generated in winding 46. Pulse 43 drives diode 141 into conduction, thereby clamping point 50 essentially to the potential present at that moment on plate 32. Thus, the potential at point 50 suddenly rises from the DC bias value to a value representative of the plate potential, forming a pulse which is rectified and integrated as previously explained. However, due to the DC potential normally at point 50, the range of AGC voltages generated are shifted closer to ground potential. For example, with 120 volts DC present at tap 58, the signal on line 24 varies from minus 20 volts with no incoming signal to minus 100 volts with an overload signal.

Figure 3:
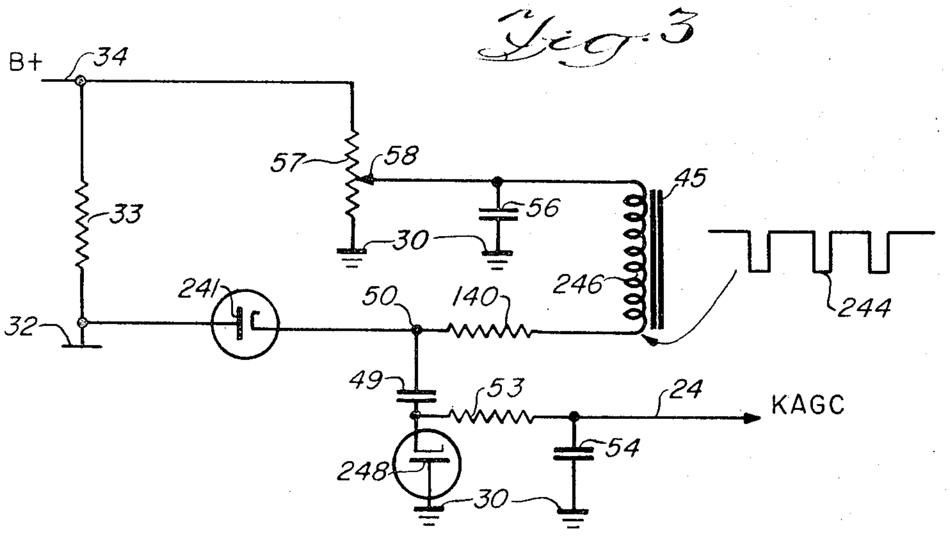
FIGURE 3 is a schematic diagram of an embodiment of the invention similar to FIGURE 2, adapted for developing an AGC voltage of opposite polarity.

If a positive polarity AGC voltage is desired, the embodiment of the invention illustrated in FIGURE 3 may be used. Tap 58 of resistor 57 is adjusted to provide a large magnitude bias potential, as +200 volts, to the cathode of a diode 241 whose plate is connected to plate 32 of the video amplifier. Due to the large positive potential on its cathode, diode 241 is cut off during the trace period. A winding 246 on flyback transformer 45 develops a negative pulse 244 of approximately 250 volts.

During the retrace interval, pulse 244 bucks the positive bias at resistor 57, causing the cathode of diode 241 to go negative with respect to the plate. As a result, diode 241 conducts, clamping point 50 to a potential substantially equal to the potential on the plate 32 of the video amplifier at that time. The resulting potential difference at junction point 50 causes a current to flow from ground 30, through a rectifying diode 248 and capacitor 49 to the junction point 50. The current flow is integrated to form a positive potential on line 24 which varies from plus 20 volts when a maximum video signal is present to plus 110 volts when no video signal is present.

Figure 4:
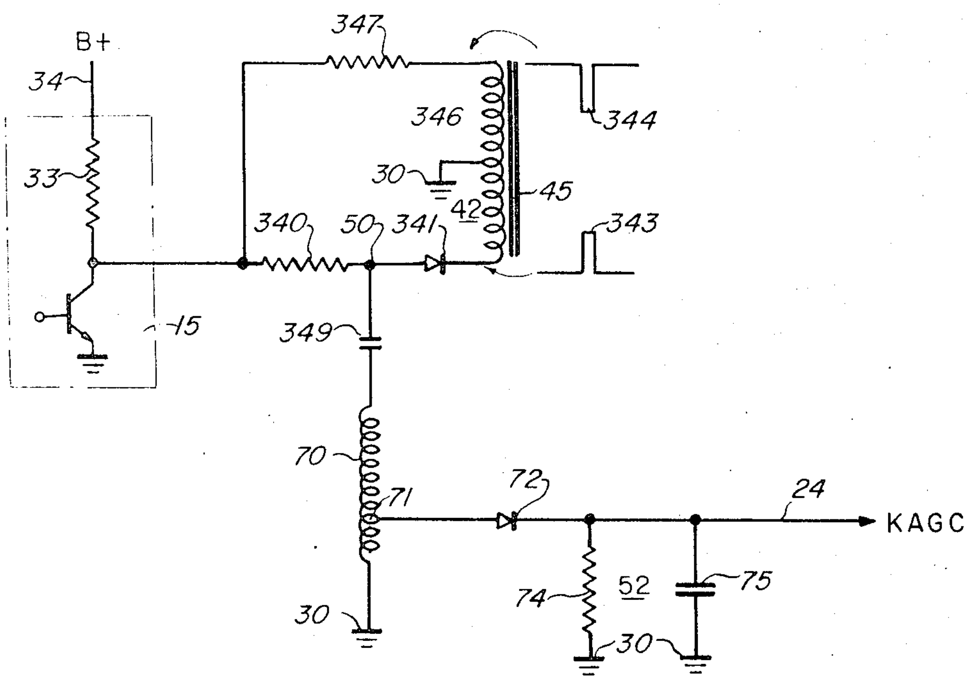
FIGURE 4 is a schematic diagram of another embodiment of the invention, for developing an AGC current for controlling transistors.
Figures 5, 6:
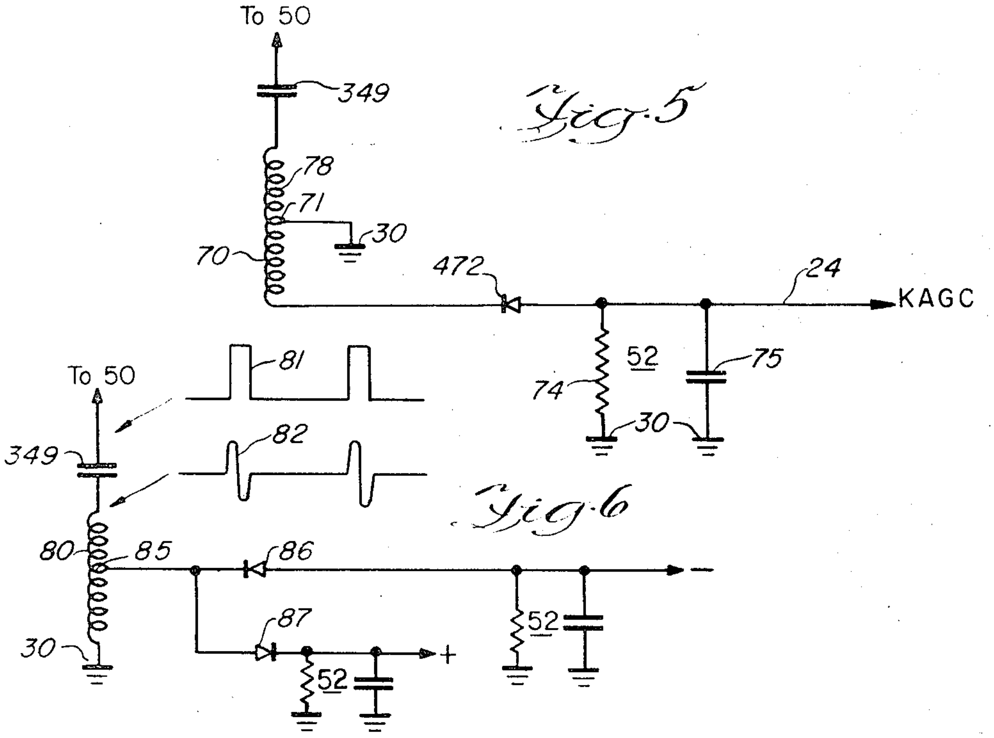
FIGURE 5 is a schematic diagram of a modification of the circuit of FIGURE 4, for developing an AGC current of opposite polarity.
FIGURE 6 is a schematic diagram of another embodiment of the invention, for developing a pair of opposite polarity AGC signals.

The novel keyed AGC circuit can be modified, as shown in FIGURES 4 and 5, to develop a current output for controlling transistorized circuitry or other electrical networks requiring current control. A 50 kilohm resistor 340 and a diode 341 are connected in series between the load resistor 33 of video amplifier 15 and pulse source 42. Source 42 is one-half of a center tapped winding 346 on flyback transformer 45, with the center tap being grounded. The operation of this circuit is similar to that described for FIGURE 1. Diode 341 normally conducts the positive going signal from the video amplifier, thereby clamping point 50 to ground potential. During the retrace interval, a positive going pulse 343 cuts off the conducting diode, raising the potential at point 50 to a value equal to the potential at the video amplifier.

To compensate for the pulse which feeds through resistor 340, a neutralizing circuit is employed. This circuit consists of a 100 kilohm resistor 347 which is coupled between resistor 340 and the remaining side of center tapped winding 346. A negative going pulse 344, which is generated in the upper half of the winding, is coupled through resistor 351 to the series connected diode circuit, producing a small negative potential at junction 50 which cancels the undesired positive pulse.

A series connected 0.02 microfarad capacitor 349 and an inductor 70 are coupled between junction point 50 and ground 30. A tap 71 near the bottom of coil 70 is connected to a rectifying diode 72 which in turn is coupled to output line 24. An integrating network 52 composed of a 5.6 kilohm resistor 74 and a 0.5 microfarad capacitor 75 is coupled between line 24 and ground 30.

Inductor 70 has a high input impedance to the pulse and a low output impedance at tap 71. As a result, the high voltage pulse at point 50 is transformed into a high current pulse and rectified by diode 72, producing a keyed AGC current output on line 24 suitable for controlling transistors or other current controlled devices.

If an AGC current of opposite polarity is desired, the circuit illustrated in FIGURE 5 may be used. The tap 71 of inductor 70 is connected to ground 30, and a rectifying diode 472 of reversed polarity is inserted in place of diode 72. The resulting negative polarity signal is suitable for use with transistors. Transformer 70 allows either or both polarities to be derived simultaneously. For example, if the circuit connected to tap 71 in FIGURE 4 was connected to a tap 78 in FIGURE 5, AGC currents of both positive and negative polarity would be simultaneously formed.

In FIGURE 6, a circuit is illustrated for developing both positive and negative AGC signals without the necessity of a grounded tap or a secondary winding on the inductor. A low impedance inductor 80, as 100 millihenries, is used in place of inductor 70 illustrated in FIGURE 5. This results in differentiation of input pulses 81, producing pulses 82 as shown in FIGURE 6. A pulse similar to pulse 82 but attenuated somewhat is available at a tap 85 on inductor 80. This symmetrical pulse at tap 85 can be rectified by either positively or negatively poled diodes. Diodes 86 and 87 are accordingly connected between tap 85 and integrating networks 52 to respectively produce negative and positive polarity AGC signals.

I claim:

1. In a television signal receiver for a composite television signal having a recurring horizontal synchronizing component, said receiver including a stage for amplifying at least a portion of said composite signal including said horizontal component, a keyed AGC circuit, comprising: a first diode; source means for generating a pulse in synchronism with said horizontal synchronizing component; a second diode; first circuit means including said first diode and said pulse source connected to an output of said amplifying stage; second circuit means including said second diode AC coupled to a junction point in said first circuit, the pulse from said source changing the conduction state of said first diode to render the potential at the junction point representative of the potential at the output of said amplifying stage during the time duration of said pulse, said second diode detecting a signal representative of the potential at the junction point during said time duration; integrating means coupled to said second circuit for developing an AGC signal from the signal detected by said second diode; means establishing a reference potential, and wherein said second circuit includes a capacitor directly coupled to the junction point and said second diode is directly coupled to said reference potential means, said integrating means being coupled between said reference potential means and a junction point between said capacitor and said second diode.

2. In a television signal receiver for a composite television signal having a recurring horizontal synchronizing component, said receiver including a stage for amplifying at least a portion of said composite signal including said horizontal component, a keyed AGC circuit, comprising: a first diode; source means for generating a pulse in synchronism with said horizontal synchronizing component; a second diode; first circuit means including said first diode and said pulse source connected to an output of said amplifying stage; second circuit means including said second diode AC coupled to a junction point in said first circuit, the pulse from said source changing the conduction state of said first diode to render the potential at the junction point representative of the potential at the output of said amplifying stage during the time duration of said pulse, said second diode detecting a signal representative of the potential at the junction point during said time duration; integrating means coupled to said second circuit for developing an AGC signal from the signal detected by said second diode; bias means having a DC potential output, and means connecting said bias means in one of said circuits for changing the range of DC magnitudes of the AGC signals developed by said integrating means.

3. The keyed AGC circuit of claim 2 wherein said source means includes a transformer winding having a first and a second end, said first end and said first diode being connected in series with said amplifying stage, means establishing a reference potential, a capacitor connected between said second end and said reference potential means for forming a shunt path at the frequency of said pulses, said bias means including a source of voltage DC coupled to resistive means, and means connecting said second end to said resistive means.

4. The keyed AGC circuit of claim 3 wherein said resistive means comprises a variable resistor.

5. In a television signal receiver for a composite television signal having a recurring horizontal synchronizing component, said receiver including a stage for amplifying at least a portion of said composite signal including said horizontal component, a keyed AGC circuit, comprising: a first diode; source means for generating a pulse in synchronism with said horizontal synchronizing component; a second diode; first circuit means including said first diode and said pulse source connected to an output of said amplifying stage; second circuit means including said second diode AC coupled to a junction point in said first circuit, the pulse from said source changing the conduction state of said first diode to render the potential at the junction point representative of the potential at the output of said amplifying stage during the time duration of said pulse, said second diode detecting a signal representative of the potential at the junction point during said time duration; integrating means coupled to said second circuit for developing an AGC signal from the signal detected by said second diode; including means for simultaneously developing a pair of AGC signals of opposite polarity.

6. In a television signal receiver for a composite television signal having a recurring horizontal synchronizing component, said receiver including a stage for amplifying at least a portion of said composite signal including said horizontal component, a keyed AGC circuit, comprising: a first diode; source means for generating a pulse in synchronism with said horizontal synchronizing component; a second diode; first circuit means including said first diode and said pulse source connected to an output of said amplifying stage; second circuit means including said second diode AC coupled to a junction point in said first circuit, the pulse from said source changing the conduction state of said first diode to render the potential at the junction point representative of the potential at the output of said amplifying stage during the time duration of said pulse, said second diode detecting a signal representative of the potential at the junction point during said time duration; integrating means coupled to said second circuit for developing an AGC signal from the signal detected by said second diode; means connected in said second circuit for producing a generally symmetrical waveform having positive and negative portions proportional to the potential at the junction point, said second diode rectifying said symmetrical waveform to develop said AGC signal.

7. The keyed AGC circuit of claim 6 including a third diode connected to said last named means and oppositely poled to said second diode, said second and third diodes producing opposite polarity AGC signals.

8. In a television signal receiver for a composite television signal having a recurring horizontal synchronizing component, said receiver including a stage for amplifying at least a portion of said composite signal including said horizontal component, a keyed AGC circuit, comprising: a first diode; source means for generating a pulse in synchronism with said horizontal synchronizing component; a second diode; first circuit means including said first diode and said pulse source connected to an output of said amplifying stage; second circuit means including said second diode AC coupled to a junction point in said first circuit, the pulse from said source changing the conduction state of said first diode to render the potential at the junction point representative of the potential at the output of said amplifying stage during the time duration of said pulse, said second diode detecting a signal representative of the potential at the junction point during said time duration; integrating means coupled to said second circuit for developing an AGC signal from the signal detected by said second diode; and said first diode is poled to condut the potential signal at said amplifying stage, said pulse driving said first diode into its nonconducting state.

9. The keyed AGC circuit of claim 8 including an isolating resistor connected in said first circuit between said first diode and said amplifying stage, and a capacitor connected to said second diode for integrating the detected signal.

10. The keyed AGC circuit of claim 8 in which said pulse source couples an undesirable pulse to said amplifying stage when said first diode is driven into its nonconducting state, wherein said source means includes means for generating a second pulse in synchronism with said horizontal synchronizing component, and third circuit means connecting said second pulse generating means to said first circuit means to substantially cancel said undesirable pulse.

11. The keyed AGC circuit of claim 10 for a television signal receiver having a flyback transformer for said receiver, wherein said source means includes winding means on said flyback transformer and having a first section for generating said pulse which changes the conduction state of said first diode and a second section for generating said second pulse, the pulses from said first and second sections being oppositely going in polarity, said first circuit means being connected to the first section of said winding means, and said third circuit means includes resistive means coupled between said second section and a point in said first circuit means between said first diode and said output of said amplifying stage for cancelling said undesirable pulse.

12. The keyed AGC circuit of claim 11 wherein said winding means has first and second end portions and a junction therebetween, ground means for establishing a source of reference potential, means coupling said junction to said ground means, said first and second end portions forming said first and second sections of said winding means, whereby said pulses are oppositely going in polarity with respect to said reference potential.

13. In a television signal receiver for a composite television signal having a recurring horizontal synchronizing component, said receiver including a stage for amplifying at least a portion of said composite signal including said horizontal component, a keyed AGC circuit, comprising: a first diode; source means for generating a pulse in synchronism with said horizontal synchronizing component; a second diode; first circuit means including said first diode and said pulse source connected to an output of said amplifying stage; second circuit means including said second diode AC coupled to a junction point in said first circuit, the pulse from said source changing the conduction state of said first diode to render the potential at the junction point representative of the potential at the output of said amplifying stage during the time duration of said pulse, said second diode detecting a signal representative of the potential at the junction point during said time duration; integrating means coupled to said second circuit for developing an AGC signal from the signal detected by said second diode; means connected in said second circuit for producing a current representative of the potential at the junction point in said first circuit, said integrating means being responsive thereto for developing an AGC current signal, wherein said current producing means comprises impedance means having an input terminal coupled to the junction point in said first circuit and an output terminal coupled to said integrating means, said input terminal having a high impedance at the frequency of said pulses, and said output terminal having a low impedance at the frequency of said pulses.

14. The keyed AGC circuit of claim 13 in which said pulse source couples an undesirable pulse to said amplifying stage when said first diode is driven into said changed conduction state which renders the potential at the junction point representative of the potential at the output of said amplifying stage, wherein said source means includes means for generating a second pulse in synchronism with said horizontal synchronizing component, and third circuit means connecting said second pulse generating means to said first circuit means to substantially cancel said undesirable pulse.

15. The keyed AGC circuit of claim 13 wherein said impedance means comprises an inductor having a first end corresponding to said input terminal, a second end point, and a tap point, means establishing a reference potential, and means connecting said second diode to one of said points and said reference potential means to the other of said points.

16. The keyed AGC circuit of claim 15 wherein said AGC current signal is negative with respect to said reference potential.

17. In a television signal receiver for a composite television signal having a recurring horizontal synchronizing component, said receiver including a stage for amplifying at least a portion of said composite signal including said horizontal component, a keyed AGC circuit, comprising: source means for generating a pulse in synchronism with said horizontal synchronizing component; means including said source means and connected to an output of said amplifying stage for developing a potential representative of the potential at said output of said amplifying stage during the time duration of said pulse; means connected to said potential developing means for producing a generally symmetrical waveform having positive and negative portions proportional to the first named potential; and means connected to said waveform producing means and including diode means poled to pass one of said portions of said waveform for producing an AGC signal.

18. The keyed AGC circuit of claim 17 wherein said means connected to said waveform producing means includes second diode means poled to pass the other of said portions at said waveform, said diode means thereby producing opposite polarity AGC signals.

References Cited

UNITED STATES PATENTS

| | | | |
|---|---|---|---|
| 2,875,277 | 2/1959 | Cope et al. | 178—7.3 |
| 2,953,640 | 9/1960 | Hellstrom | 178—7.3 |

RICHARD MURRAY, *Primary Examiner.*

ROBERT L. RICHARDSON, *Assistant Examiner.*